United States Patent [19]

Andersen

[11] Patent Number: 5,094,186
[45] Date of Patent: Mar. 10, 1992

[54] LAYING NEST FOR POULTRY

[75] Inventor: Soren E. Andersen, Haulundvej, Denmark

[73] Assignee: Landemeco A/S, Ologod, Denmark

[21] Appl. No.: 474,065

[22] PCT Filed: Dec. 4, 1987

[86] PCT No.: PCT/DK87/00151
§ 371 Date: Jul. 2, 1990
§ 102(e) Date: Jul. 2, 1990

[87] PCT Pub. No.: WO89/03637
PCT Pub. Date: May 5, 1989

[30] Foreign Application Priority Data

Oct. 30, 1987 [DK] Denmark ............... 5714/87

[51] Int. Cl.$^5$ ............................................. A01K 31/16
[52] U.S. Cl. ..................................... 119/49; 119/50.5
[58] Field of Search ............... 119/50.5, 48, 49, 45.1, 119/22, 21

[56] References Cited

U.S. PATENT DOCUMENTS

| | | | |
|---|---|---|---|
| 1,688,779 | 10/1928 | Bolinger | 119/49 |
| 2,608,178 | 8/1952 | Kolber | 119/21 |
| 2,623,499 | 12/1952 | King | 119/50.5 |
| 2,764,128 | 9/1956 | Howley et al. | 119/48 X |
| 2,992,628 | 7/1961 | McDaniel | 119/49 |
| 3,045,645 | 7/1962 | Fisher | 119/49 |
| 3,242,904 | 3/1966 | Rannou | 119/48 |
| 3,339,528 | 9/1967 | Summerour | 119/22 X |
| 3,465,723 | 9/1969 | Matunaga | 119/48 |

FOREIGN PATENT DOCUMENTS

| | | | |
|---|---|---|---|
| 1163598 | 2/1964 | Fed. Rep. of Germany | 119/48 |
| 8702668 | 2/1989 | Netherlands | 119/45.1 |
| 0269111 | 4/1927 | United Kingdom | 119/48 |

*Primary Examiner*—Robert P. Swiatek
*Assistant Examiner*—Todd E. Manahan
*Attorney, Agent, or Firm*—Antonelli, Terry, Stout & Kraus

[57] ABSTRACT

A laying nest for poultry includes a housing having an entrance and a two-part nest bottom, with the respective parts being inclined toward one another and substantially toward a center of the nest so as to create a slit through which laid eggs may roll down onto a conveyor. A barring arrangement is provided in front of the entrance of the housing so as to selectively permit the poultry to enter and leave the housing.

5 Claims, 1 Drawing Sheet

LAYING NEST FOR POULTRY

FIELD OF THE INVENTION

The present invention relates to a laying nest for poultry and, more particularly, a laying nest for hens.

BACKGROUND OF THE INVENTION

Recently, poultry keeping in accordance with an aviary system has spread at the expense of the more traditional battery hen system. With the aviary system, the poultry move freely in a large shed or enclosure where the poultry has a litter base for scraping and perches so that they may freely move around the shed. By these perches there are feed troughs and drinking means within reach of the perches and, nests are provided for the laying. All of the equipment in the shed or enclosure must, of course, be available in a number corresponding to the number of poultry being accommodated.

Generally, the laying nests are arranged in rows next to each other and, possibly in tiers, and a conveyor means, in the form of a conveyor belt, extends at each tier along a length of all of the laying nests for enabling a systematic collecting of the eggs.

In, for example, Danish Patent Application 4831/86 a laying nest system is proposed wherein each nest has an inclining nest bottom so that the laid eggs will automatically roll toward a rear wall of nest, pass through an opening therein and roll down onto a conveyor belt for immediate conveyance. While this proposed system functions excellently in practice, a disadvantage thereof resides in the fact that, since the nest area itself in each nest box only makes up about two thirds of the area occupied by the nest box, considerable wasted space is created since the hens will of course not be permitted access to the conveyor belt and the eggs thereon.

Generally, in proposed constructions, the nest bottom is divided into at least two parts with at least one of the parts being inclined and arranged higher with respect to the remainder to the bottom of the nest thereby creating a slit or opening in a center area of the nest bottom to permit a passage of the eggs therethrough.

SUMMARY OF THE INVENTION

The aim underlying the present invention essentially resides in providing a laying nest which optimally utilizes the nest space, that is, minimizes wasted space.

In accordance with advantageous features of the present invention, a laying nest for poultry is provided which includes a housing having an entrance and an nest bottom as well as a conveyor arranged below the nest bottom for conveying laid eggs, with the nest bottom being divided into two parts, one of the two parts is inclined and arranged at a position higher than the remainder of the nest bottom so as to create a slit or opening to permit a passage of eggs through the opening. The conveyor is arranged immediately below the nest bottom and a net or grate is arranged below the slit or opening over which the eggs roll before reaching the conveyor.

By virtue of the above noted features of the present invention, it is possible to utilize the entire area of the nest box as a nest bottom. Thus, in the shed or enclosure more space will be provided around the nest box and, consequently, the shed may hold more poultry without densifying the population of the poultry thus optimizing the aviary system.

Furthermore, with the present invention, it is easier to increase the size of the laying nests so that a number of hens such as, for example, five to fifteen, may sit at the same time in the same nest thereby promoting the well being and inclination of the hens to lay eggs since this behavior is natural to hens.

Advantageously, in accordance with further features of the present invention, the net or grate is arranged end to end at a lowest portion of the nest bottom.

By virtue of the last mentioned features of the present invention, a disappearance nest is ensured whereby the eggs are quickly removed from the nest even if a large number of hens are sitting on the nest. Furthermore, a nest bottom is provided which is reminiscent of the nest recess as compared with conventional nests thereby inducing the hens to move toward the center of the nest providing a better utilization of space as well as a quicker conveyance of the eggs since the disappearance or removal slit is present at approximately a center of the nest.

In order to prevent any impurities, litter, feed and manure remanent, etc., from being carried down onto the conveyor with the eggs, the conveyor, fashioned as a belt conveyor, extends substantially below one of the nest bottom parts such that the impurities or other contaminants drop through the net thereby insuring clean eggs and preventing clean eggs from being smudged at a later stage on the conveyor belt.

To ensure a sufficient space for guide bars, etc for preventing the eggs from rolling off the conveyor other than at the end where the conveyor discharges the eggs, in accordance with further features of the present invention, the entrance of the housing is barred by a barring means arranged in such a manner that it may be removed from the entrance.

To control the laying of eggs in a relatively simple matter, according the present invention, the barring means includes a plurality of bars suspending from a displaceable wire or rod, with the bars being rotatably suspended along a longitudinal axis of the wire or rod and having a shape or longitudinal extent such that they cannot pass through the entrance to the nest.

By virtue of the last noted features of the present invention, it possible to control access to all of the nests and to prevent the nest from being used, for example, for sleeping places if such is not desired. Furthermore, such features provide for a very high degree of simplified nest cleaning since the poultry keeper may entirely decide when to admit the hens to the nests.

The barring means may, in accordance with the present invention, include two substantially parallel bars space apart at a distance for permitting the poultry to insert their head therebetween but not permit the body of the poultry to pass therebetween.

The invention will now be further explained in the following with reference to the drawing showing two embodiments of a laying nest according to the invention arranged in the same shed wherein.

Figure 1:
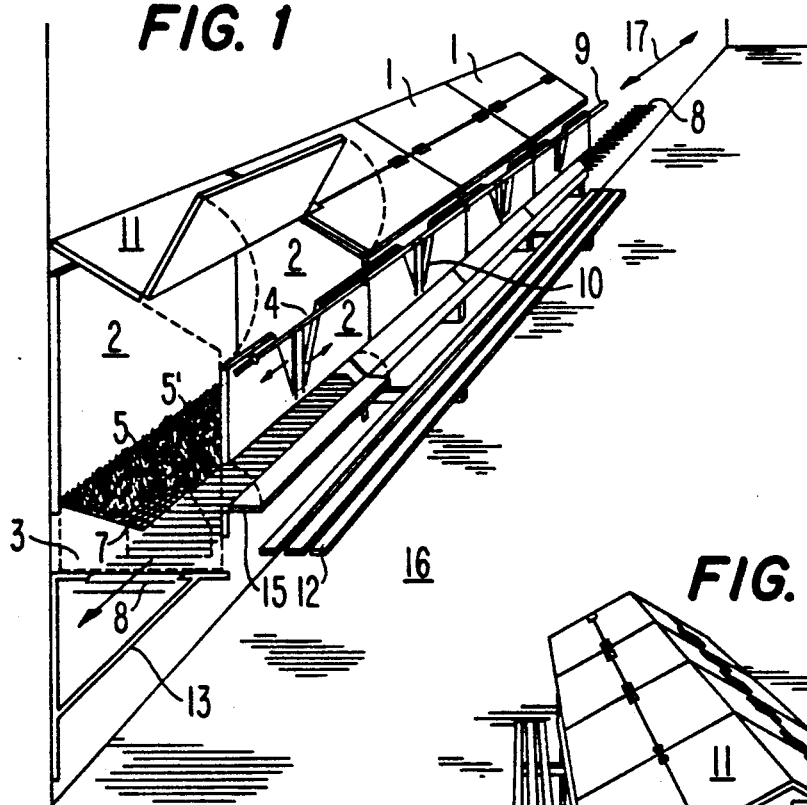
FIG. 1 is a perspective view of a first embodiment of the present invention wherein a row of laying nests are adapted to be mounted on a wall.
Figure 2:
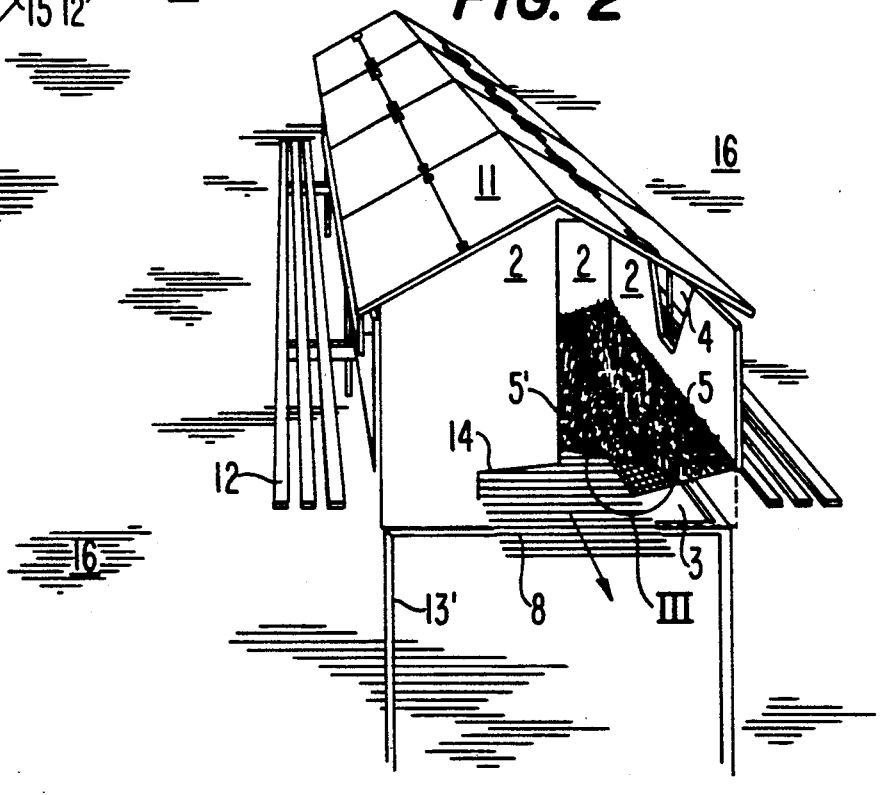
FIG. 2 is a perspective view of another embodiment of the present invention wherein a row of double nests are provided and adapted for standing detached on a frame on a floor or support structure.

The drawing shows a row of laying nests or nest boxes 1 mounted on a wall frame 13 (FIG. 1) or on a floor frame 13' (FIG. 2).

Perches 12 are provided in front of the laying nests or nest boxes so that the hens may more easily enter or leave the nests.

Each nest box 1 includes walls 2, a bottom 3 and a roof 11 which may be opened for inspection and cleaning purposes.

Figure 3:
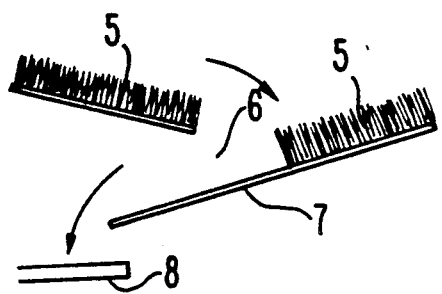
FIG. 3 is a schematic detailed view, on an enlarged scale, taken in an area of III in FIG. 2.

A nest bottom is provided in each nest box 1 with the nest bottom including inclining plates 5 and 5' covered by nest material such as plastic mats of ASTRO-TURF. The two bottom plates 5 and 5' incline towards each other but are relatively displaced in vertical direction thereby forming a slit 6 between the nest bottoms permitting eggs to roll through the slit, across a grate 7 and onto the conveyor belt 8 which may, for example, be a generally known soft rubber or plastic conveyor belt carrying away the eggs. The grates 7 ensure that impurities etc. will not be carried with the eggs down onto the belt 8 (see particularly FIG. 3).

Entrances 4 are provided at the front of each nest box and an elongated inspection panel 15 is provided below the entrances 4 for enabling an inspection and perhaps cleaning of the bottom area below the nest bottom. The nest boxes 1 may also be built up without bottom 3 so that impurities etc. will fall directly down onto the floor 16 where there is already provided litter for the hens for scraping.

The inspection panel 15 may also be used for manual collection of eggs in small sheds where there is no desire to spend costs on conveyor, automatic equipment etc.

A barring means 10 may be provided in front of the nest entrances 4 with the barring means 10 being, for example, in the form of two rigid metal wires which are rotatably suspended from a wire or rod 9 allowing the hens to leave the nest without problems but not to enter same again since the wires 10 are suspended on the outside and impinge on the edges of the nest entrance 4.

Access to the nests is provided by axially sliding the wire or rod 9 in the direction of the arrow 17 so that the barring means 10 will no longer bar the entrance 4 to the nests and the hens may freely move in and out of the nests.

It is thus possible to bar the nests, i.e. to slide the barring means 10 to assume the position shown in the drawing and then to entice all the hens down onto the floor or onto the perches supplying feed to the feed troughs. When the hens have left the nest boxes 1, they cannot enter the nest boxes 1 again and will, for example, have to spend the night sitting on the perches. This will prevent the hens from fouling the next boxes 1 when eating. If such a feed sequence is made immediately before switching out the light, the hens will sleep sitting on the perches. As soon as the light is again switched on, the hens will seek the laying nests and the entrance may be opened permitting the hens to go to the nests to lay eggs.

The shown nest boxes 1 are preferably made of 9-12 mm waterproof plywood and the nest bottoms 5 and 5' are covered by ASTRO-TURF having fibres of a length of approx. 20 mm. The conveyor 8 is, for example, a TREVIRA belt of a width of 25-50 cm and the rate of motion of such an egg belt is of the order of 6 meters per minute. The nest boxes 1 may also be made of plastic or some other material which is attractive to the poultry.

The physical dimensions of each nest box 1 are a length of approx. 2.5 m, a width of 0.5 m and a height of 0.7-0.8 m. The double nests in FIG. 2 have of course twice the width. The internal nest measurements of each next box 1 are of the order of 60×50 cm.

The net or grate 7 mounted between the nest bottom and the conveyor 8 has a width of the order of 4 cm and extends along an entire length of the house just as the slit 6, with the conveyor 8 exiting through an opening 14 provided in one of the walls 2.

While the drawing shows only two embodiments where one is a double nest (FIG. 2) having a common conveyor 8 for neighboring nests. It is obvious to a person skilled in the art that in practice the nests may be designed in many other ways without departing from the basic invention.

I claim:

1. A laying nest for poultry, the laying nest comprising:

a housing means for accommodating said laying nest;

entrance means for permitting poultry to enter and leave the housing means;

a nest bottom means including two nest bottom parts, one of the two nest bottom parts is inclined with respect to the other nest bottom part and is arranged in a position higher than a remainder of the nest bottom means so as to create an opening in a center area of the nest bottom means for allowing a passage of eggs therethrough;

conveyor means arranged immediately below the nest bottom means for receiving the eggs passing through the opening and transferring the eggs out of the nest; and for removing impurities from exteriors of the eggs passing through said opening means including one of a net and a grate forming an extension of said other nest bottom part over which the eggs roll prior to reaching the conveyor means.

2. A laying nest according to claim 1, wherein the conveyor means includes a belt conveyor disposed immediately below a free end of said means for removing impurities from exteriors of the eggs.

3. A laying nest according to one of claims 1 or 2, further comprising means for selectively barring the poultry from entering and leaving the housing means through said entrance means.

4. A laying nest according to claim 3, wherein said means for selectively barring said poultry includes a plurality of bars, suspending means for suspending said bars so as to be selectively movable from a position preventing entry of poultry into the housing means to a position premitting entry and including one of a wire and rod having said bars attached thereto, and means for supporting said suspending means to enable said bars to be rotatable about a longitudinal axis of said suspending means thereby enabling a positioning of said bars.

5. A laying nest according to claim 4, wherein at least two bars are provided at each entrance means, said at least two bars are spaced at a distance from each other so as to permit only a head of the poultry to enter the housing means when said means for barring is in the position preventing entry of the poultry into the housing means.

* * * * *